Jan. 21, 1936.  E. GRAY  2,028,152
HYDRAULIC TRANSMISSION
Filed May 15, 1933  3 Sheets-Sheet 2
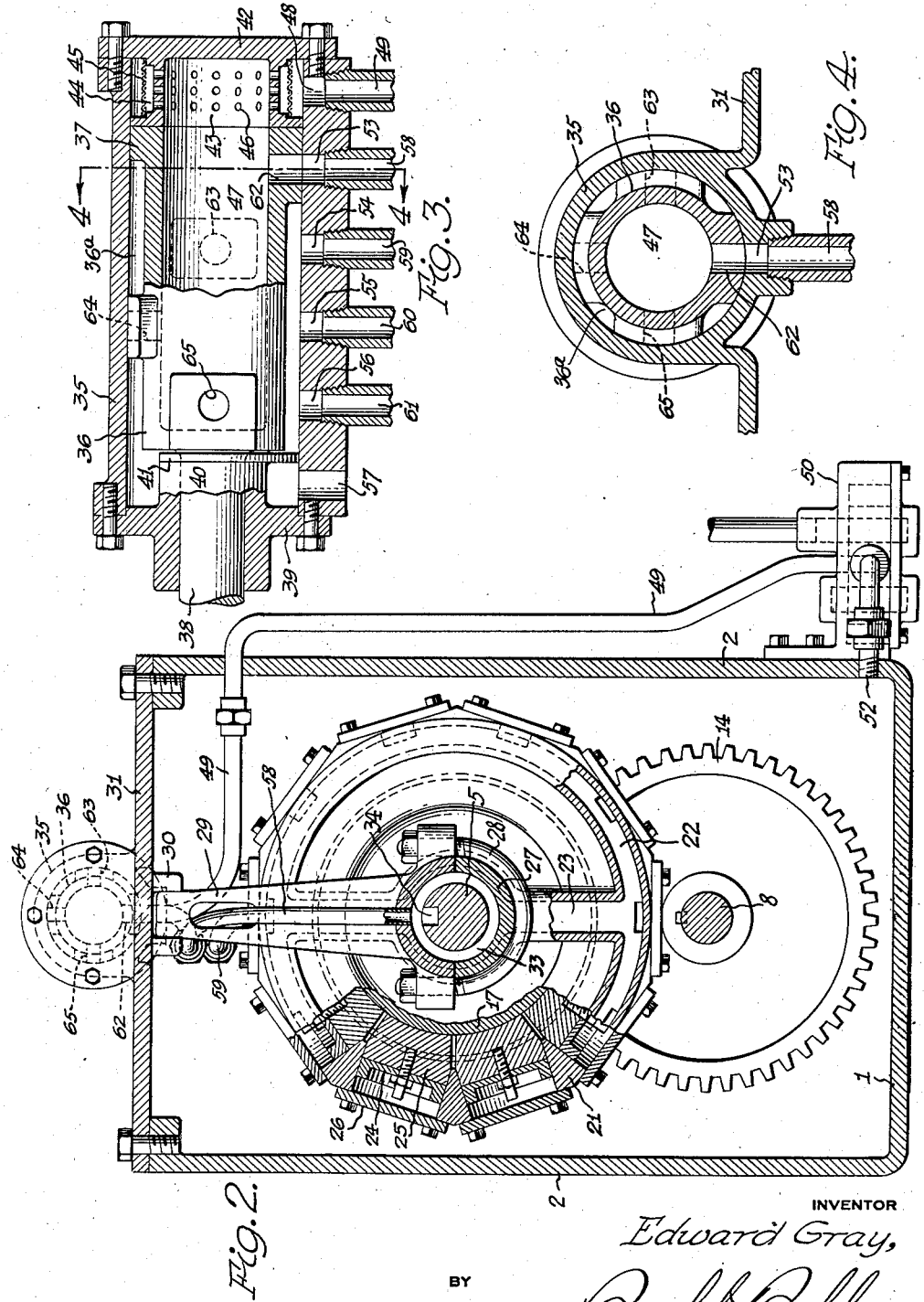
INVENTOR
Edward Gray,
BY
ATTORNEYS

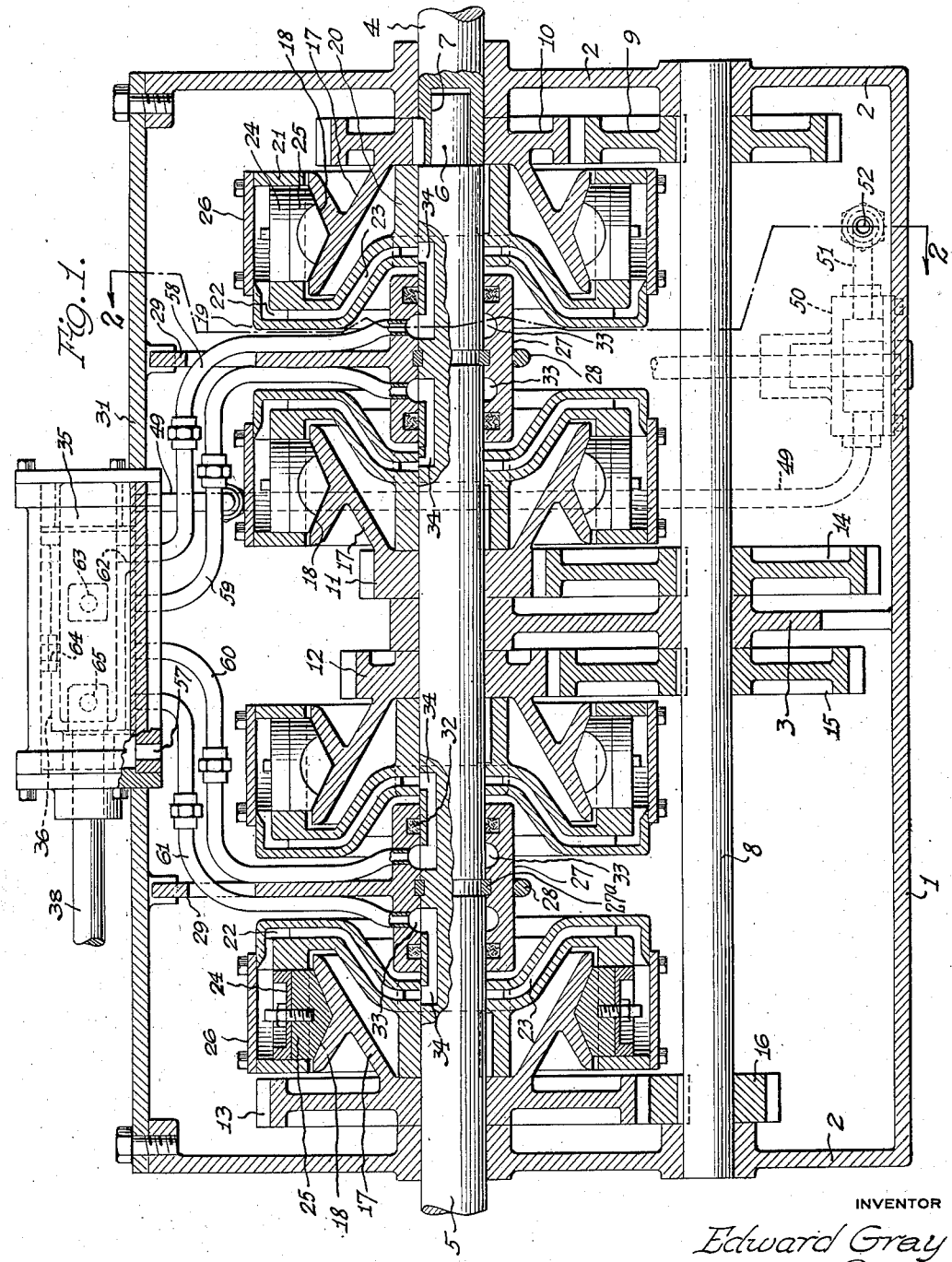

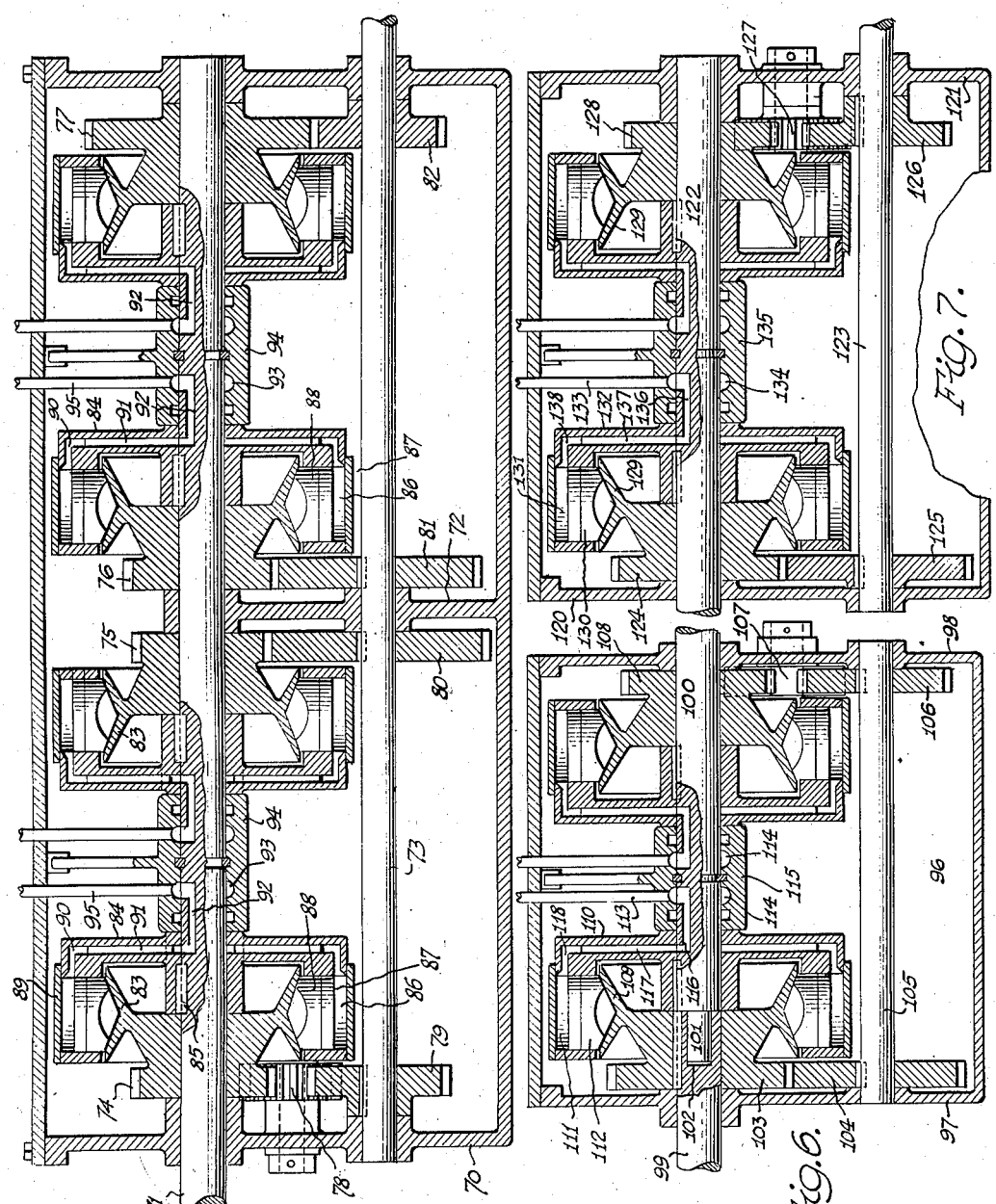

Patented Jan. 21, 1936

2,028,152

UNITED STATES PATENT OFFICE 2,028,152

HYDRAULIC TRANSMISSION

Edward Gray, Detroit, Mich.

Application May 15, 1933, Serial No. 671,180

5 Claims. (Cl. 192—87)

The present invention pertains to a novel transmission of variable torque, or change speed type, especially suitable for heavy duty use, such as in connection with locomotives, heavy motor vehicles such as trucks and tractors, although it is equally applicable to lighter automotive vehicles such as pleasure cars, and for marine purposes as well as for the transmission of power in connection with stationary power plants of industrial machinery, or in combination with any other devices, mechanisms or machines wherein it is necessary or desirable that during the operation thereof the relative torque or speed of a driving and driven member may be varied.

The primary object of the present invention is to provide a variable torque or change speed transmission embodying a plurality of independently and selectively operable clutches, arranged and constructed so that engagement of any one of the same establishes a driving connection between a drive and driven member, the transfer parts directly associated with each of the several clutches being constructed so that the relative torque or speed of the drive and driven member is varied by engaging different clutches. The invention thus provides a transmission wherein engagement of the lower torque and higher speed elements, or engagement of the higher torque and lower speed elements, may be effected without difficulty and silently even though the several elements are stationary or rotating at a high rate of speed.

Another object of the present invention is to provide a variable torque or change speed transmission that may be operated to provide transfer connections of varied torque or speed without the use of an intermediary master clutch.

Another object of the present invention is to provide a change torque or change speed transmission including a plurality of sets of selectively engaged torque transfer elements adapted to be interposed between an engine and a driven member wherein changes may be made from one speed connection to another without reducing the speed of the engine and thus permit an uninterrupted flow of power and constant acceleration from an idle position to the highest possible speed of operation.

With the above and other ends in view the invention consists in matters hereinafter set forth and more particularly pointed out in the appended claims, reference being had to the accompanying drawings, in which—

Fig. 1 is a vertical cross section of the present transmission with parts in elevation.

Fig. 2 is a transverse cross section taken on line 2—2 of Fig. 1;

Fig. 3 is a vertical cross section of the selective control valve;

Fig. 4 is a transverse cross section of the valve taken along the line 4—4 of Fig. 3;

Fig. 5 is a vertical cross section of a modified form;

Fig. 6 is a vertical cross section of another modified form; and

Fig. 7 is a vertical cross section of still another modified form.

Like characters of reference are employed throughout to designate corresponding parts.

In Fig. 1 the numeral 1 designates a casing formed with end walls 2 and a transverse wall or partition 3. A shaft 4 has one end received in one of the end walls 2 and projects outwardly relative thereto, and it will be understood that this shaft is to be connected to an engine or power plant so that the same shall be rotated. Inasmuch as the particular power plant forms no part of this invention it has been omitted from the drawings, and for the purpose of an understanding the shaft 4 is hereby termed and hereinafter known as the drive member.

Journalled in the other end wall 2 and in the transverse wall or partition 3 is a shaft 5 having pilot portion 6 rotatably received in an axial bore 7 in the drive member 4. The shaft 5 is adapted to be connected to any device that is to be rotated and will hereinafter be termed the driven member.

A countershaft 8 has its opposite ends rotatably journalled in the end walls 2 of the casing and is supported intermediate its ends by the transverse wall 3. The end of the shaft 8 which is adjacent the drive member 4 has a gear 9 keyed thereon to mesh with a gear 10 on the drive member, so that the drive member and countershaft rotate in unison. The gears 9 and 10 are preferably formed of equal radii so that the drive member 4 and countershaft 8 rotate at the same speed. It will be understood that this gear ratio, as well as any others to be presently described, may be varied without departing from the spirit of the invention, the particular ratios shown and described being by way of example only.

Loosely mounted on the shaft 5 are a series of gears designated as 11, 12 and 13, the gear 11 being considerably smaller than the gear 10, the gear 12 being larger than the gear 11 and smaller than the gear 10, and the gear 13 being larger than the gear 10. On the counter shaft 8 are keyed gears 14, 15 and 16 which mesh with the gears 11, 12 and 13 respectively. It is apparent therefore that the gears 11, 12 and 13 are geared to rotate with the drive member 4 at different speeds relative thereto and relative to each other.

On each of the gears 10, 11, 12 and 13 are formed or secured drums 17, the drums being disposed in a plane at one side of the gears and having a circumferentially extending groove 18 formed to resemble a flattened letter V in cross section. Adjacent each of the drums 17 are provided spiders 19, having central hubs 20 keyed to the shaft 5. Each spider 19 is formed with a plurality of cylinders 21 and with an annular passage 22 that provides communication between the cylinders. A radially extending duct 23 is formed in each spider and has one end extending through the hub 20 and its other end communicating with the passage 22. In each cylinder 21 is reciprocally mounted a piston 24 having a shoe 25 thereon whose inner end is wedge-shaped and adapted to fit into the groove 18 of the drums when moved into contact therewith. Each cylinder 21 is closed at its outer end by a removable cover plate 26.

Between each pair of spiders 19 there is provided a sleeve 27, which for sake of convenience in assembly around the shaft 5 is illustrated as being formed in two sections that are secured together surrounding a portion of the shaft 5 by U-bolts 28. To hold each sleeve against rotation there is provided an outwardly extending arm 29 whose outer end is received between abutments 30 on one of the side walls, or the removable top 31 of the casing 1. To hold the sleeve 27 against lengthwise shifting relative to the shaft 5, a split ring 27a is mounted in registering grooves in the shaft 5 and sleeve 27. Adjacent each end of the sleeves 27 are provided packing glands 32 and each sleeve is provided with spaced annular grooves 33. The shaft 5 is formed with channels 34 and one end of each channel communicates with one of the ducts 23 and the other end of each channel communicates with one of the grooves 33.

Mounted externally of the casing 1 is a hollow cylindrical body 35 within which is rotatably received a plug valve 36, one end of the plug valve having an annular enlargement 37 disposed adjacent one end of the cylindrical body 35 and the other end of the plug having a stem 38 that is journalled in an end plate 39 on the other end of the cylindrical body. The end plate 39 has an axial boss 40 providing a bearing for the valve stem 38 and a support for a transverse partition 41 in the cylindrical body, it being noted that the uppermost edge of the partition is spaced from the top of the cylindrical body.

The end of the cylindrical body adjacent the enlargement 37 is provided with an end closure 42 having an axial hollow boss 43 formed with an external groove 44 in which is received a cylindrical screen 45. The hollow boss 43 has a series of perforations 46 providing communication between the groove 44 and the chamber formed by the hollow boss. The plug valve 36 is provided with an axial bore 47.

The cylindrical body 35 is provided with a port 48 having a pipe line 49 connected thereto, the opposite end of the line being connected to a fluid pump 50 whose intake line 51 communicates with the interior of the casing 1 through a port 52. Ports 53, 54, 55, 56 and 57 are formed in spaced relation in the side wall of the cylindrical body 35, the port 53 being connected by a line 58 to the groove 33 communicating with the channel 34 that is in communication with the cylinders 21 associated with the drum 17 on the gear 10, the port 54 being likewise connected by a line 59 to the clutch parts associated with the gear 11, the port 55 being connected by a line 60 to the clutch parts associated with the gear 12, the port 56 being connected by a line 61 to the clutch parts associated with the gear 13, and the port 57 opening into the casing 1.

The plug valve 36 has a series of apertures 62, 63, 64 and 65 formed therein to register with the ports 53, 54, 55 and 56 respectively, the apertures being arranged so that only one can be in registration with a port at any one time. It will be noted that the valve plug 36 does not entirely fill the space within the cylindrical body, and that the plug is formed with seats surrounding the apertures 62 to 65, these seats contacting with the inner surface of the cylindrical body. The space between plug valve 36 and the cylindrical body is designated in Figs. 3 and 4 by the numeral 36a.

The operation will be described in reference to the direct drive connection wherein the drive member and driven member rotate at the same speed. In this case the stem 38 is rotated to cause registration between the aperture 62 in the valve plug 36 and the port 53, the valve parts being shown in this particular position in Fig. 3. The casing 1 is maintained partially filled with lubricating oil at all times, and oil is drawn from the casing 1 and forced by the pump 50 through the line 49 and port 48 into the groove 44 in the end closure 42. The oil passes through the screen 45 and perforations 46 and enters the bore in the valve plug 36, and thus a constant supply of oil under pressure is maintained in the bore in the plug.

The oil is discharged from the bore 47 in the valve plug through the aperture 62, port 53, line 58, groove 33, channel 34, radial duct 23, and annular passage 22 to the cylinders 21 on the spider 19 adjacent the gear 10. Introduction of fluid under pressure in the cylinders 21 causes the pistons 24 to move inwardly and thus force the shoes 25 into contact with the drum 17 on the gear 10. Contact of the shoes with the drum in this manner establishes a driving connection between the gear 10, drum 17 thereon, and the adjacent spider 19 to the shaft 5. As previously pointed out the gear 10 is mounted directly on the drive member 4, and the spider 19 adjacent the gear 10 is keyed to the shaft 5 and therefore actuation of the clutch parts as above described establishes a driving connection between the gear 10 and shaft 5 so that they rotate as one.

The clutch parts adjacent the gear 13 are operated by rotating the valve plug 36 until the aperture 65 therein registers with the port 56 in the cylindrical body. Inasmuch as the gear 13 is larger than the gear 16, the shaft 5 is caused to rotate at a lower rate of speed than the drive member 5 and the clutch associated with the gear 13 is the low speed or high torque clutch.

The parts above described as associated with the gear 10 constitute the second ratio mechanisms, and constitutes a higher speed and lower torque connection than the parts associated with the gear 13, and is the means for attaining the second speed selection.

The parts associated with the gear 12 are actuated as above described by rotating the valve plug 36 until the aperture 64 registers with the port 55 at which time fluid under pressure is conveyed to the clutch parts. As the gear 15 is of greater diameter than the gear 12 the latter causes rotation of the clutch parts at a speed greater than the shaft 8 and drive member 4, thus attaining the third speed ratio.

The parts associated with the gear 11 are actuated by causing registration of the aperture 63 with the port 54 so that fluid pressure is conveyed to the clutch parts through the line 59. Inasmuch as the gear 14 is of greater diameter than the gear 11, and also of greater diameter than the gear 15, these parts comprise the fourth speed ratio which is the highest.

Adequate lubrication of all the moving parts is attained by maintaining a supply of lubricating fluid in the casing 1 so that the gears 9, 14, 15 and 16 splash therein. Adequate lubrication of the moving parts on the shaft is provided by providing a slight clearance between the valve plug and the cylindrical body 35 so that a slight seepage of oil takes place through all of the apertures 62, 63, 64 and 65 to maintain a level of lubricating fluid in the cylindrical casing 35 as high as the partition 41. In this manner the lines 61 and fluid conveying channels, ducts and grooves connected therewith are maintained full of lubricant by gravity flow thereof from the cylindrical casing 35. The lubricant that flows over the partition 41 is permitted to discharge through the port 57 into the casing 1.

It will be noted that the construction above described causes constant rotation of the spiders 19 at any time the drive member 4 is rotated, and centrifugal forces set up by this rotation cause the reciprocal pistons 24 to move outwardly and carry their shoes 25 away from their adjacent drums 17. No mechanical means for retracting the pistons is necessary in view of this construction.

The embodiment just described is illustrative of the invention as applied to locomptive transmissions and with reference to Fig. 5 the invention as applied to an automotive vehicle will be described. In Fig. 5 the numeral 70 designates a casing in which a drive shaft 71 is rotatably journalled, the drive shaft being supported intermediate the ends of the casing by a transverse partition or wall 72. A driven shaft 73 is journalled in the casing 70 and supported intermediate the ends of the casing in the wall 72, the axes of the shafts 71 and 73 being parallel.

Loosely mounted on the drive shaft 71 in spaced relation are gears 74, 75, 76 and 77. The gear 74 constantly meshes with an idler gear 78 which in turn constantly meshes with a gear 79 that is keyed on the driven shaft 73. Gears are keyed on the driven shaft 73 to constantly mesh with gears 75, 76 and 77 respectively. Each set of gears 75—80, 76—81 and 77—82 are formed of different diameters to provide different speed ratios.

Each gear 74, 75, 76 and 77 has a drum 83 formed integral therewith at one side thereof, the drum preferably being substantially V-shaped in cross section. Adjacent each drum 83 there is provided a spider 84, keyed as at 85 to rotate with the drive shaft 71. Each spider is provided with a plurality of cylinders 86 within which are slidably received pistons 87 having shoes 88 shaped to contact with the drum 83, the cylinders being closed at their outer ends by cover plates 89. Communicating with each cylinder is an annular passage 90 that is connected by a radially extending duct 91 leading to a channel 92 in the drive shaft 71, the channel 92 in turn communicating with an internal groove 93 in a sleeve 94.

A supply line 95 is connected to the sleeve 94 to introduce fluid under pressure to the groove 93 from which it is conveyed by channel 92, radial duct 91, and annular passage 90 to the cylinders to move the pistons 87 so that the shoes 88 contact with the drum 83.

When the shoes 88 engage the drum 83 on the gear 74 the latter is caused to rotate with the drive shaft 71 to rotate the idler gear 78, gear 79 and driven shaft 73 in one direction, which in the case of an automotive vehicle would be reverse. Similarly the clutches associated with the gears 75, 76 and 77 may be engaged to rotate the drum shaft 73 through gears 80, 81 or 82 respectively.

Inasmuch as the valve for selecting and operating the clutches is identical to that used in connection with the first described embodiment the same has not been shown in association with the present embodiment, it being understood, however, that this transmission contemplates the use of such a valve for directing fluid under pressure to any of the clutches independently.

In Fig. 6 there is illustrated an embodiment of the present invention as applied for marine purposes, and the numeral 96 indicates a casing having end walls 97 and 98. A drive shaft 99 has one end journalled in the end wall 97 and its other end is adapted to be connected to a power plant. A driven shaft 100 is provided with a co-axial pilot 101 received in a concentric bore 102 in the drive shaft 99, the other end of the driven shaft extending through and being journalled in the casing wall 98. Keyed on the end of the drive shaft 99 within the casing 96 is a gear 103 constantly meshing with a gear 104 on a countershaft 105. Keyed on the countershaft 105 is a gear 106 constantly meshing with an idler gear 107 that constantly meshes with a gear 108 loosely mounted on the driven shaft 100. From the foregoing it becomes apparent that the gear 103 rotates with the drive shaft 99 and through gear 104 rotates the counter shaft 105, to rotate gear 106, idler 107, and gear 108 so that the latter rotates in reverse direction to the gear 103.

Each of the gears 103 and 108 has a drum 109 formed integral therewith at one side thereof, the outer periphery of the drum 109 being substantially V-shaped in cross section. Keyed to the driven shaft 100 adjacent each drum 109 is a spider 110 having a plurality of cylinders 111 in which are slidably received clutch members 112 which are adapted to be forced into clutching engagement with the drums by introducing fluid under pressure into the cylinders. The fluid under pressure is conveyed from a pressure source through line 113 to an internal groove 114 in a sleeve 115, through a channel 116 in the shaft 100 to a radial duct 117 in the spider, to an annular passage 18 that communicates with all the cylinders.

When the clutch members adjacent the drum on the gear 103 are engaged the shaft 100 rotates with the shaft 99 and when the clutch parts are moved into contact with the drum on the gear 108 the shaft 100 is caused to rotate in a reverse direction.

In Fig. 7 there is illustrated a casing having end walls 120 and 121. A drive shaft 122 is rotatably journalled in the end walls with one end extending through the wall 120 and adapted to be connected to a power plant. A driven shaft 123 is rotatably journalled in the end walls and has one end extending through the end wall 121. It will be understood that when the device is used for marine purposes the drive shaft 122 will be connected to a power plant in a boat and the driven shaft 123 will be connected to the propeller.

Loosely mounted on the drive shaft 122 is a gear 124 that constantly meshes with a gear 125 on the driven shaft 123. On the opposite end of the driven shaft within the casing is keyed a gear 126 constantly meshing with an idler gear 127 that in turn constantly meshes with a gear 128 keyed on the drive shaft 122. Each of the gears 124 and 128 has an integral drum 129 that co-operates with clutch shoes 130 that are slidably supported in cylinders 131 on a spider 132. The shoes 130 are adapted to be forced into contact with the drum by fluid under pressure entering the cylinders 131 through a line 133, groove 134 in a sleeve 135, channel 136 in shaft 122, radial duct 137 and annular passage 138.

When the clutch parts associated with gear 124 are actuated the driven shaft 123 is caused to rotate in one direction through gears 124 and 125, and when the clutch associated with the gear 128 is actuated the driven shaft 123 is rotated in a reverse direction through gear 128, idler 127 and gear 126.

Although a specific embodiment of the present invention has been illustrated and described it is to be understood that various changes may be made in the details of construction without departing from the spirit of the invention as defined by the scope of the appended claims, and such changes are contemplated.

What I claim is:—

1. A transmission clutch comprising a drum formed with a circumferential V-shaped groove, an annular spider member, said spider being formed with a plurality of closely clustered cylinders, piston shoes slidably received in said cylinders and having their ends shaped to fit said groove, and means for supplying fluid under pressure into said cylinders to move said piston shoes into engagement with said drum.

2. A transmission clutch comprising a drum, an annular spider member co-axial with said drum and over-lapping the same, said spider being formed with a hub portion and with a plurality of closely clustered cylinders disposed with their axes extending radially relative to said hub, pistons slidably mounted in said cylinders and adapted to frictionally engage said drum, said spider being formed with an annular passage arranged adjacent to the outer extremities of said cylinders, said spider being formed with means of communication between said annular passage and each of said cylinders, said spider having radially disposed passages extending from said hub to said annular passage, and means for supplying fluid under pressure to said passages in said hub.

3. A transmission clutch comprising a drum formed with a circumferentially extending groove, an annular spider member co-axial with said drum and over-lapping the same, said spider being formed with a hub portion and with a plurality of closely clustered cylinders disposed with their axes extending radially relative to said hub, pistons slidably mounted in said cylinders and adapted to frictionally engage said drum, the inner ends of said shoes being shaped to fit into said V-shaped groove, said spider being formed with an annular passage arranged adjacent to the outer extremities of said cylinders, said spider being formed with means of communication between said annular passage and each of said cylinders, said spider having radially disposed passages extending from said hub to said annular passage, and means for supplying fluid under pressure to said passages in said hub.

4. In combination with a plurality of transmission clutches, including movable shoes and means extending through the hubs of the parts that support said shoes for supplying liquid under pressure to move the same, of a valve casing, independent lines connecting said valve casing to each of said means in said hub, a valve plug in said casing and adapted to be connected to a source of liquid pressure, said valve plug having ports adapted to independently register with said lines to supply liquid under pressure to said lines selectively, said valve plug being proportioned to permit a predetermined seepage of liquid into said casing, and means in said casing for maintaining lines which are out of register with ports in said plug maintained full of liquid under no pressure other than its own weight.

5. In a device of the character described, a rotatable shaft having a pair of fluid clutches thereon, said clutches including a plurality of shoes slidably mounted in an annular member and means in said annular member for conveying fluid under pressure to move said shoes, a casing supporting said shaft and enclosing said clutches, a sleeve on said shaft between said clutches, a split ring mounted in a groove in said sleeve and a groove in said shaft to permit relative rotation and to prevent endwise relative movement, said shaft being formed with fluid conveying means extending from said means in said annular member to annular grooves in said sleeve, means for conveying fluid under pressure to said annular grooves, and means on said sleeve and engaging means on said casing for preventing rotation of said sleeve without hindering endwise movement thereof.

EDWARD GRAY.